United States Patent [19]

Fu et al.

[11] Patent Number: 5,657,867

[45] Date of Patent: Aug. 19, 1997

[54] DEVICE FOR CONTAINING A COMPACT DISC

[75] Inventors: David Fu, Rowland Heights; Michael Mencacci, Los Angeles; William R. Miller, Huntington Beach, all of Calif.

[73] Assignee: Rembrandt Photo Services, Commerce, Calif.

[21] Appl. No.: 577,426

[22] Filed: Dec. 22, 1995

Related U.S. Application Data

[63] Continuation-in-part of Ser. No. 455,015, May 31, 1995, which is a continuation-in-part of Ser. No. 326,540, Oct. 20, 1994, which is a continuation-in-part of Ser. No. 145,253, Oct. 29, 1993, and Ser. No. 14,817, Oct. 29, 1993, Pat. No. Des. 353,837.

[51] Int. Cl.[6] .................................................. B65D 85/57
[52] U.S. Cl. .......................................... 206/308.1; 206/312
[58] Field of Search .................................. 206/307–313, 206/308.1, 308.3, 387.13, 459.5; 229/68.1; 156/290; 493/199, 203

[56] References Cited

U.S. PATENT DOCUMENTS

| | | |
|---|---|---|
| D. 240,816 | 8/1976 | Peterson . |
| D. 242,960 | 1/1977 | Stanley . |
| D. 261,155 | 10/1981 | Nast . |
| D. 262,040 | 11/1981 | Wihlke . |
| D. 304,781 | 11/1989 | Hanson . |
| D. 316,107 | 4/1991 | Lockner . |
| D. 316,180 | 4/1991 | Hines . |
| D. 318,068 | 7/1991 | Truc et al. . |
| D. 325,817 | 5/1992 | Call . |
| D. 345,765 | 4/1994 | Fritz . |
| 429,752 | 6/1890 | Camp . |
| 821,019 | 5/1906 | Cooke, Jr. . |
| 1,029,836 | 6/1912 | Warne . |
| 1,168,634 | 1/1916 | Hoffman . |
| 1,186,312 | 6/1916 | Hanselmann . |
| 1,315,696 | 9/1919 | Alstrand . |
| 1,459,457 | 6/1923 | Wilburger . |
| 1,563,034 | 11/1925 | Levine . |
| 2,463,450 | 3/1949 | Wisner . |

(List continued on next page.)

FOREIGN PATENT DOCUMENTS

| | | |
|---|---|---|
| 0022973 | 6/1948 | Finland . |
| 0642651 | 9/1928 | France . |
| 1194784 | 11/1959 | France . |
| 0125897 | 5/1919 | United Kingdom . |

OTHER PUBLICATIONS

Specimen of double page for "CD Wallet" product Model No. PCD32; Alpha Enterprises, Inc. (First Version), 1993.
Specimen of double page for "CD Wallet" product Model No. PCD32; Alpha Enterprises, Inc. (Second Version), 1993.
Specimen of double page for "CD Preserver" product; Pride Plastics.
Specimen of "ProSleeve" CD sleeve; Case Logic, Inc.
Cover page and pp. 32–33 of 20th Century Plastics Catalog, Jan. 1991, California.
Drawing of CD sleeve album Page, ACCO USA, Inc.
Specimen (xerographic cop) of CD sleeve album page, ACCO USA, Inc.

Primary Examiner—Jimmy G. Foster

[57] ABSTRACT

A flexible plastic device for containing a compact disc and having a pocket configured such that the compact disc may be easily inserted into and removed from the pocket. The pocket is formed by a rectangular flexible plastic sheet and another flexible plastic sheet in superposed relation and welded together along three edges thereof with an opening between the rectangular sheet and an unsealed edge of the other sheet for receiving the disc, the unsealed edge extending between opposing welded together edges of the sheets and projectively contoured, the other sheet having an aperture for permitting access to the disc at the disc aperture when the disc is contained in the pocket, the other sheet having a narrow gap in the unsealed edge approximately mid-width thereof and communicating with the aperture of the other sheet.

40 Claims, 2 Drawing Sheets

U.S. PATENT DOCUMENTS

| | | |
|---|---|---|
| 2,500,773 | 3/1950 | Robins . |
| 2,881,912 | 4/1959 | Kursh . |
| 3,422,952 | 1/1969 | George . |
| 3,443,686 | 5/1969 | Raymond . |
| 3,446,260 | 5/1969 | Osher . |
| 3,473,653 | 10/1969 | Nunes . |
| 3,688,898 | 9/1972 | Stanton . |
| 3,722,564 | 3/1973 | Croon . |
| 3,864,755 | 2/1975 | Hargis . |
| 4,043,477 | 8/1977 | Deese . |
| 4,076,874 | 2/1978 | Giovanelli et al. . |
| 4,263,357 | 4/1981 | Holson . |
| 4,327,831 | 5/1982 | Inara et al. . |
| 4,339,034 | 7/1982 | Panveno . |
| 4,365,708 | 12/1982 | Tyus . |
| 4,413,298 | 11/1983 | Pecsok et al. . |
| 4,447,973 | 5/1984 | Wihlke . |
| 4,473,153 | 9/1984 | Colangelo . |
| 4,508,366 | 4/1985 | Brindle . |
| 4,538,730 | 9/1985 | Wu . |
| 4,549,658 | 10/1985 | Sfikas . |
| 4,566,590 | 1/1986 | Manning et al. . |
| 4,610,352 | 9/1986 | Howey et al. . |
| 4,620,630 | 11/1986 | Moss . |
| 4,623,062 | 11/1986 | Chase et al. . |
| 4,676,374 | 6/1987 | Wilkins . |
| 4,699,268 | 10/1987 | Oishi . |
| 4,704,042 | 11/1987 | Eisen et al. . |
| 4,709,812 | 12/1987 | Kosterka . |
| 4,778,047 | 10/1988 | Lay . |
| 4,793,477 | 12/1988 | Manning et al. . |
| 4,850,731 | 7/1989 | Youngs . |
| 4,971,195 | 11/1990 | Mitsuyama . |
| 5,085,318 | 2/1992 | Liverick . |
| 5,087,145 | 2/1992 | Cooley . |
| 5,154,284 | 10/1992 | Starkey . |
| 5,207,717 | 5/1993 | Manning . |
| 5,312,507 | 5/1994 | Miller ................................ 156/290 |

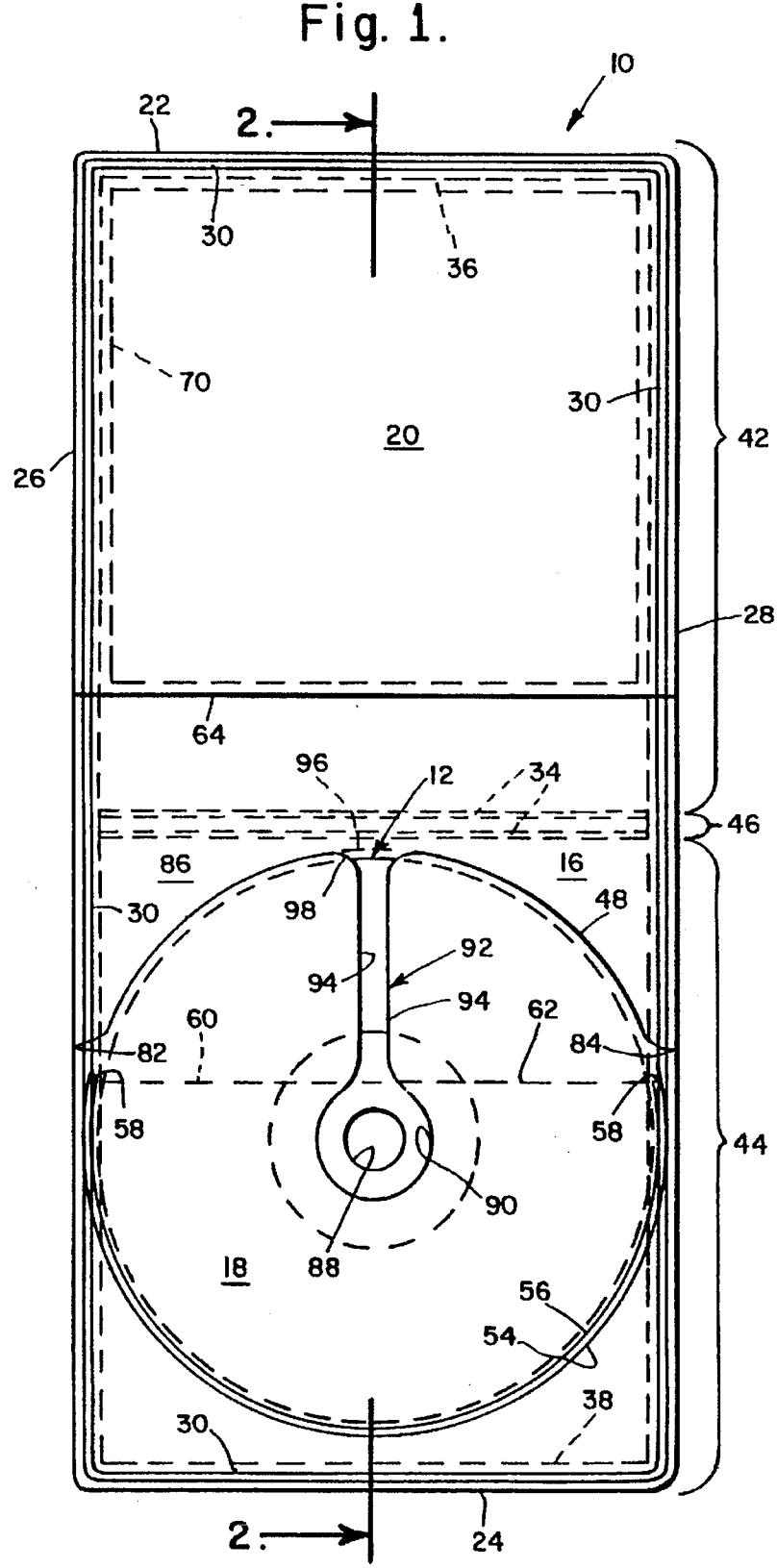
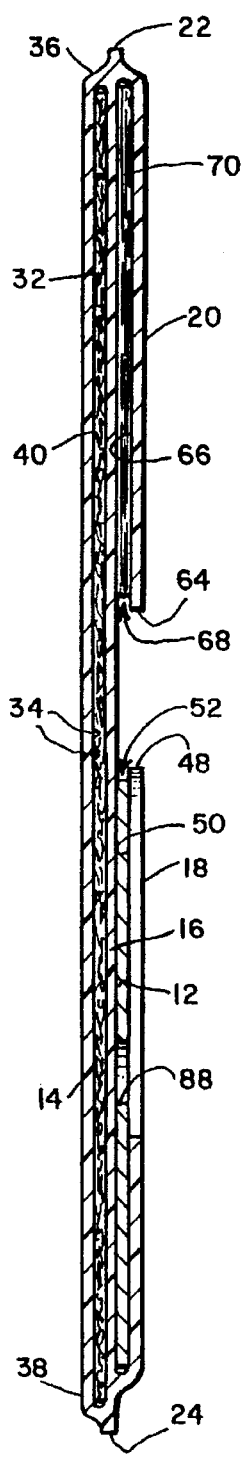

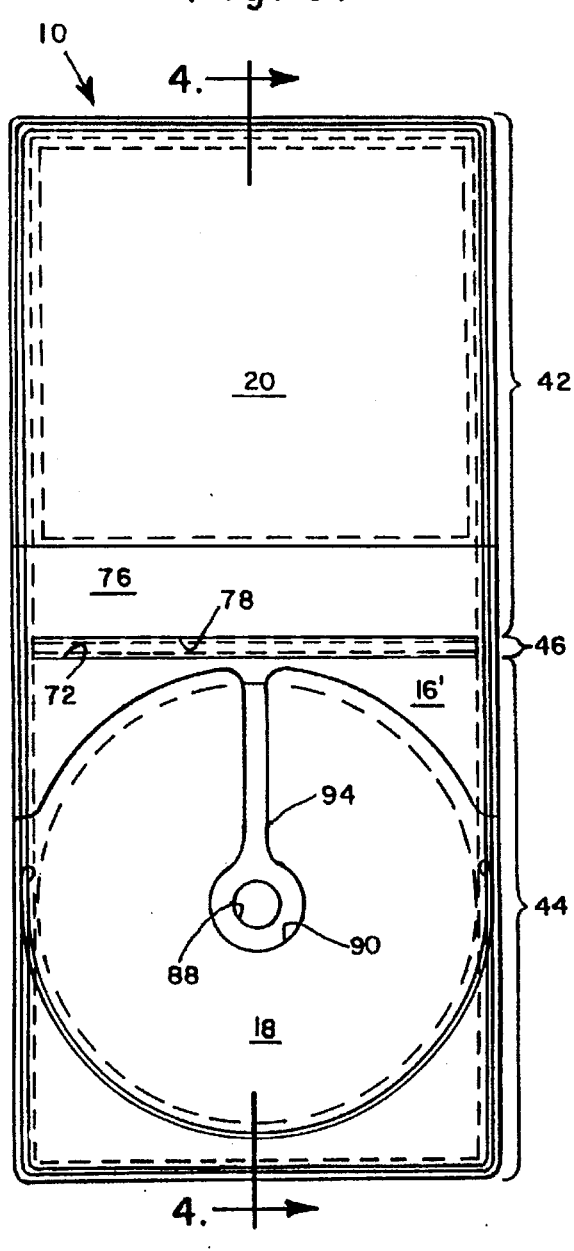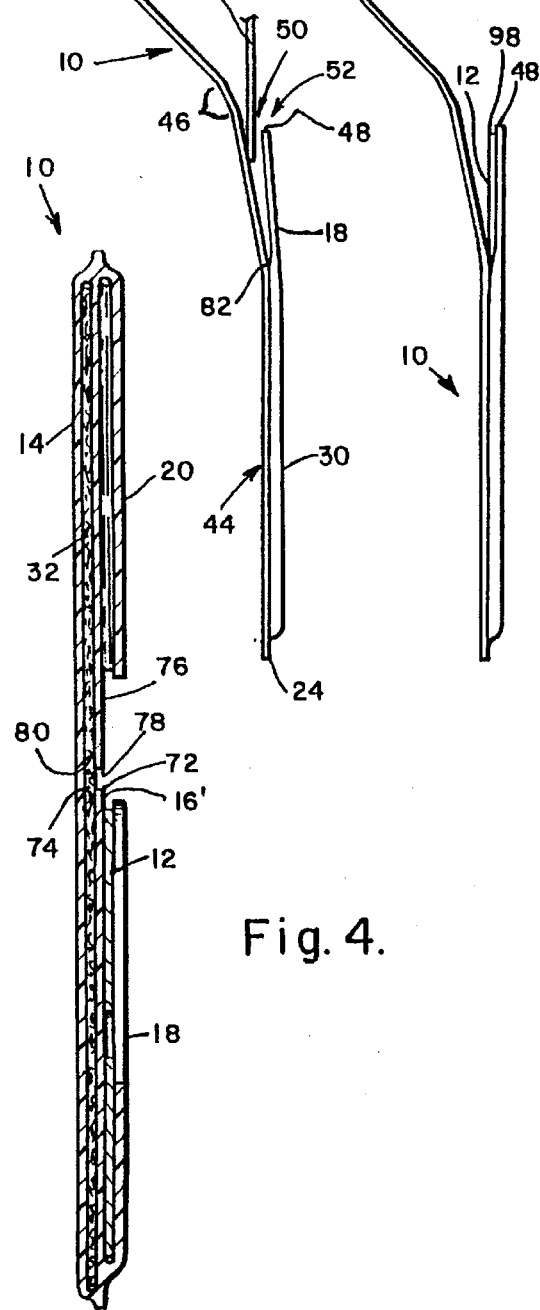

5,657,867

DEVICE FOR CONTAINING A COMPACT DISC

CROSS REFERENCE TO RELATED APPLICATIONS

This application is a continuation-in-part of U.S. patent application Ser. No. 08/455,015, filed May 31, 1995, pending, which is a continuation-in-part of copending U.S. patent application Ser. No. 08/326,540, filed Oct. 20, 1994, pending, which is a continuation-in-part of copending U.S. patent application Ser. No. 08/145,253, filed Oct. 29, 1993, pending, and of U.S. patent application Ser. No. 29/014,817, filed Oct. 29, 1993, now U.S. Pat. No. 353,837, all of which applications are incorporated herein by reference.

BACKGROUND OF THE INVENTION

This invention relates to devices for protectively storing discs, and more particularly to plastic wallets for containing discs such as optical digitally encoded discs.

The well known "compact disc" or "CD" includes optical digitally encoded information thereon for playback or read back by optical transducer means utilizing a laser device. CDs are typically individually packaged in a reusable storage device for protecting the CD and its optical information surface.

Plastic wallets for protectively storing CDs are disclosed in parent applications Ser. Nos. 08/455,015 and 08/326,540, which applications are incorporated herein by reference. The inventions described therein include wallets constructed of welded together flexible plastic sheets forming a pocket between two of the sheets having a first opening for receiving the CD. Preferred embodiments of the disclosed wallets provide that the two sheets are further welded together by a seam along a circular arc exceeding 180° including welds at the termini of the arc defining a second opening for the CD pocket for permitting passage therethrough of at least one-half but not the entirety of the disc when the disc is received by the first opening. The width of the second opening and the diameter of the arc are related to the diameter and the thickness of the CD such that the CD resists withdrawal from within the arc through the second opening when at least one-half of the disc is contained within the arc.

The typical CD includes a central aperture and the wallet may include, particularly in embodiments wherein the CD may be substantially entirely contained within the pocket, an opening or slot in one of the sheets for affording manual access to the CD's central aperture for assisting in withdrawing the CD through the second and first pocket openings. A slot, as taught in parent application Ser. No. 08/326,540, longitudinally extends toward the wallet's spine and permits a person to manually urge the CD at its central aperture for displacing a portion of the CD from the pocket, the slot being sufficiently long for thereupon affording access through the slot to an edge of the CD for displacing the CD's central aperture from the third pocket, permitting the person to grasp the CD at its aperture and its circumferential edge for completely removing the CD from the pocket without touching the CD's encoded surface.

Another pocket configuration for facilitating CD removal without touching the CD's information surface is the thumb notch configuration disclosed in U.S. Pat. No. 4,850,731, to Ross O. Youngs, wherein the pocket's unsealed edge describes a broad notch for permitting simultaneous access to the CD's central aperture and circumferential edge when the CD is inserted in the pocket and throughout the removal process.

Notwithstanding that CD removal is facilitated by such devices, there remained a need for increasing the facility with which the CD may be inserted into the pocket. One device for accomplishing this result is disclosed in parent application Ser. No. 08/455,015, by configuring the pocket's unsealed edge with a thumb notch extending from rounded corners thereof, the rounded corners being folded thereacross to form ears extending away from the pocket for facilitating entry of the CD into the pocket.

SUMMARY OF THE INVENTION

The present invention provides a device or wallet for holding or containing a compact disc or CD, including a pocket configured such that the CD may be easily inserted into and removed from the pocket. Briefly described, the device for holding or containing a compact disc having a central aperture comprises a rectangular flexible plastic sheet and another flexible plastic sheet in superposed relation and welded together along three edges thereof forming a pocket having an opening between the rectangular sheet and an unsealed edge of the other sheet for receiving the disc, the unsealed edge extending between opposing welded together edges of the sheets and projectively contoured, the other sheet having an aperture for permitting access to the disc at the disc aperture when the disc is contained in the pocket, the other sheet having an arrow gap in the unsealed edge approximately mid-width thereof and communicating with the aperture of the other sheet. The gap communicates with the aperture of the other sheet along a slit in the other sheet which is narrower than the aperture of the other sheet. The unsealed edge of the other sheet extends along an arc of radius at least as great as approximately the radius of the disc, and such arc may be approximately 180° or less, and preferably approximately 160° or less such as approximately 135°. Such arc is preferably a circular arc substantially concentric with the disc when the disc is contained in said pocket.

Preferably, the other sheet is welded to the rectangular sheet by a seam defining the depth in the pocket to which the disc may be inserted when received by the opening, and the device my include two welds welding together the sheets and defining therebetween a second opening of the pocket for permitting passage through the second opening of at least one-half but not the entirety of the disc when the disc is received by the opening along the unsealed edge, the width of the second opening being related to the diameter and thickness of the disc such that the disc resists withdrawal from within the pocket through the second opening when at least one-half of the disc is received by the second opening.

The seam defining the depth in the pocket to which the disc may be inserted is situated along a circular arc having a radius slightly greater than the radius of the disc and substantially concentric with the disc when the disc is contained in the pocket. The arc exceeds 180°, and the seam may include the two welds (discussed in the immediately preceding paragraph) at the termini of such arc defining the second opening. Preferably, substantially the entirety of the disc is contained in the pocket when at least one-half of the disc is received by the second opening.

The preferred embodiment of a wallet in accordance with the present invention, for containing a compact disc having a central aperture, comprises the combination of: a rectangular transparent first flexible plastic sheet and a rectangular second flexible plastic sheet of substantially the same dimensions as the first sheet, the first and second sheets welded together along four edges thereof; a rectangular graphics sheet interposed between the first and second sheets and enclosed within the welded edges of the welded together first and second sheets, the graphics sheet having graphics thereon viewable through the first sheet; the welded together first and second sheets and the interposed graphics sheet foldable along their width dimension to form a front cover and a rear cover separated by a spine; and a third flexible plastic sheet superposed on one of the covers with the second sheet interposed between the first and third sheets, the third sheet welded along three edges thereof to three edges of the one cover forming a pocket having an opening between the one cover and an unsealed edge of the third sheet for receiving the disc, the unsealed edge extending between opposing welded together edges of the one cover and the third sheet and projectively contoured toward the spine, the third sheet having an aperture for permitting access to the disc at the disc aperture when the disc is contained in the pocket, the third sheet having a narrow gap in the unsealed edge approximately mid-width the third sheet and communicating with the aperture of the third sheet. The gap communicates with the aperture of the third sheet along a slit in the third sheet which is narrower than the aperture of the third sheet. The unsealed edge of the third sheet extends along an arc of radius at least as great as approximately the radius of the disc, and such arc may be approximately 180° or less, and preferably approximately 160° or less such as approximately 135°. Such arc is preferably a circular arc substantially concentric with the disc when the disc is contained in the pocket.

The wallet preferably further includes a fourth flexible plastic sheet superposed on the other of the covers with the second sheet interposed between the first and fourth sheets, the fourth sheet welded along three edges thereof to three edges of the other cover forming a pocket between the other cover and the fourth sheet having an opening along an unsealed edge of the fourth sheet facing the spine.

Preferably, the third sheet is welded to the second sheet, but not to the first sheet, by a seam defining the depth in the pocket to which the disc may be inserted when received by the opening, and the device may include two welds welding together the second and third sheets and defining therebetween a second opening of the pocket for permitting passage through the second opening of at least one-half but not the entirety of the disc when the disc is received by the opening along the unsealed edge, the width of the second opening being related to the diameter and thickness of the disc such that the disc resists withdrawal from within the pocket through the second opening when at least one-half of the disc is received by the second opening.

The seam defining the depth in the pocket to which the disc may be inserted is situated along a circular arc having a radius slightly greater than the radius of the disc and substantially concentric with the disc when the disc is contained in the pocket. The arc exceeds 180°, and the seam may include the two welds (discussed in the immediately preceding paragraph) at the termini of such arc defining the second opening. Preferably, substantially the entirety of the disc is contained in the pocket when at least one-half of the disc is received by the second opening.

In an alternative embodiment of a wallet for containing a compact disc, there is provided a rectangular first flexible plastic sheet foldable along its width dimension to form a front cover and a rear cover separated by a spine; a rectangular second flexible plastic sheet in superposed relation with the first sheet and welded to the first sheet along at least three edges thereof including three edges of one of the covers; and a third flexible plastic sheet superposed on the one cover with the second sheet interposed between the first and third sheets, the third sheet welded along three edges thereof to three edges of the second sheet forming a pocket superposed on the one cover and having an opening between the second sheet and an unsealed edge of the third sheet for receiving the disc, the unsealed edge having a contour projecting toward the spine and extending between two opposing welded together edges of the second and third sheets, the third sheet having an aperture for permitting access to the disc at the disc aperture when the disc is contained in the pocket, the third sheet having a narrow gap in the unsealed edge approximately mid-width the third sheet and communicating with the aperture of the third sheet.

BRIEF DESCRIPTION OF THE DRAWINGS

The novel features which are believed to be characteristic of the invention, together with further advantages thereof, will be better understood from the following description considered in connection with the accompanying drawings in which preferred embodiments are illustrated by way of example. It is to be expressly understood, however, that the drawings are for the purpose of illustration and description only and are not intended as a definition of the limits of the invention.

FIG. 1 is an elevation view of the inside of a preferred embodiment of a wallet for containing a compact disc or CD according to the present invention, shown in open condition and with a compact disc or CD contained therein;

FIG. 2 is a cross-sectional elevation view of the CD wallet of FIG. 1, taken along the line 2—2 of FIG. 1 in the direction of the appended arrows;

FIG. 3 is an elevation view of the inside of an alternative preferred embodiment of a wallet for containing a compact disc according to the present invention, shown in open condition and with a compact disc or CD contained therein;

FIG. 4 is a cross-sectional elevation view of the CD wallet of FIG. 3, taken along the line 4—4 of FIG. 3 in the the direction of the appended arrows;

FIG. 5 is a side elevation view of the CD wallet of FIGS. 1 or 3, shown in an open condition in preparation for insertion of a compact disc; and FIG. 6 is the same view of the CD wallet as shown in FIG. 5, with a compact disc contained therein and for being removed therefrom.

DETAILED DESCRIPTION OF THE PREFERRED EMBODIMENTS

Turning to FIGS. 1 and 2, there is shown a preferred embodiment of a wallet 10 for protectively storing a disc and in particular an optical digitally encoded compact disc or CD 12. The CD wallet 10 includes a transparent, substantially rectangular first flexible plastic sheet 14, a substantially rectangular second flexible plastic sheet 16, a third flexible plastic sheet 18, and a substantially rectangular fourth flexible plastic sheet 20. Except for the configuration of the third sheet 18, the preferred CD wallet embodiment 10 is similar to the CD wallet taught in parent application Ser. No. 08/435,015, shown and described specifically in FIGS. 11–15 and the corresponding specification text thereof.

The sheets 14, 16, 18, 20 are of thermoplastic sheet material, i.e. plastic sheet material which is susceptible to thermo-adhesive welding techniques for securing the sheets together. One example of such thermoplastic sheet material is polyvinyl chloride, or vinyl, and welds or seams sealing the sheets together may be produced by well known radiofrequency welding techniques. A preferred example of a thermoplastic sheet material is a polyolefin such as polypropylene, which material is substantially chemically inert so as not to react with dyes, inks and other surface components of the compact discs, and is substantially resistant to extreme heat and cold. Utilizing polypropylene sheet material for the sheets 14, 16, 18, 20, such sheets may be welded together by known methods and apparatus for thermoplastic welding, for example thermocontact welding techniques such as taught by U. S. Pat. No. 5,312,507 incorporated herein by reference or by ultrasonic welding techniques utilizing, for example, a Branson Model 900 Series Ultrasonic Actuator manufactured by Branson Ultrasonics Corporation of Danbury, Conn.

Returning to FIGS. 1 and 2, the first flexible plastic sheet includes an upper edge 22, a lower edge 24, a left edge 26, and a right edge 28, as viewed in the drawing of FIG. 1, which edges also define the respective edges of the CD wallet 10. The first sheet 14 and the CD wallet 10 each have a longitudinal dimension extending between the lower and upper edges 24, 26 (i.e. the vertical dimension as viewed in the drawing of FIG. 1), and a width dimension extending between the left and right edges 26, 28 (i.e. the horizontal dimension as viewed in the drawing of FIG. 1).

The second flexible plastic sheet 16 has substantially the same longitudinal and width dimensions as the first plastic sheet 14. The first and second plastic sheets 14, 16 are welded to each other along their respective four edges, by means of the welded edge seam 30 extending along the edges 22, 26, 24, 28 of both the first and second sheets 14, 16.

The second sheet 16 may be transparent but is preferably opaque. Preferably, the second sheet 16 is a thermoplastic composite material constructed of a spun or nonwoven polypropylene fabric laminated to a cast polypropylene backing sheet, such as a one ounce spun or nonwoven polypropylene fabric laminated to a 60 micron polypropylene backing sheet. The first and second sheets 14, 16 are welded together with the nonwoven fabric (i.e. the exposed surface of the nonwoven fabric of the composite second sheet 16) facing away from the first plastic sheet 14. If the second sheet 16 were to comprise a plastic sheet without the nonwoven material, the second sheet 16 would preferably be opaque and have an embossed surface facing away from the first plastic plastic sheet 14.

A graphics sheet 32 is interposed between the first and second plastic sheets 14, 16 and entrapped or enclosed within the seamed edges 22, 24, 26, 28 of the welded together first and second plastic sheets 14, 16. The rectangular graphics sheet 32 includes a longitudinal dimension (i.e. the vertical dimension as viewed in the drawing of FIGS. 1 and 2) slightly less than the longitudinal dimension of the first and second plastic sheets 14, 16, and a width dimension (i.e. the horizontal dimension as viewed in the drawing of FIGS. 1 and 2) slightly less than the width dimension of the first and second sheets 14, 16, such that the interposed graphics sheet 32 fits within and extends nearly to the edge seam 30 sealing the edges 22, 24, 26, 28 of the first and second sheets 14, 16. The graphics sheet 32 is typically of a paper or paperboard material, and is preferably of greater rigidity than either of the first and second plastic sheets 14, 16; preferably, the rigidity of the graphics sheet 32 is greater than the rigidity of the superposed first and second sheets 14, 16. In one suitable example of a CD wallet 10, the graphics sheet 32 was 12-point chip SBS paperboard, the first plastic sheet 14 was a 115 micron high clarity polypropylene sheet material, and the second plastic panel was a composite material of one ounce spun or nonwoven polypropylene laminated to a 60 micron polypropylene backing.

The orientation of the paperboard graphics sheet 32 is such that the width dimension of the graphics sheet 32 is along or parallel to the paperboard's grain direction. The graphics sheet 32 includes two parallel scored lines or scores 34 thereon along the graphics sheet's width dimension, these scores 34 being spaced from one another for forming a spine section therebetween when the graphics sheet 32 is folded along the scores 34, the spine section being approximately midway of the graphics sheet's longitudinal dimension (i.e. midway between the upper edge 36 and the lower edge 38 of the graphics sheet 32 as viewed in the drawing of FIGS. 1 and 2). The scores 34 may be formed by methods well known in the paper processing art, and typically have impressed concave profiles along the side or surface 40 of the graphics sheet 32 on which the graphic indicia or graphics are printed. The printed surface 40 of the graphics sheet 32 faces the transparent first plastic sheet 14.

When the graphics sheet 32 is folded or pivoted along the scores 34, the first and second flexible plastic sheets 14, 16 follow the more rigid graphics sheet 32 and bend or fold along the graphics sheet's scores 34, such that the welded together sheets 14, 16 with entrapped graphics sheet 32 fold along their width dimension to form a front cover 42 and a rear cover 44 separated by a spine 46 coextensive with the graphics sheet spine section defined by the two scores 34, with the graphics on the printed surface 40 of the graphics sheet 32 being viewable through the outwardly disposed transparent first plastic sheet 14.

The third flexible plastic sheet 18 is superposed on the rear cover 44, with the second sheet 16 interposed between the first and third sheets 14, 18. If the second sheet 16 comprises a composite nonwoven fabric and backing sheet, the exposed surface of the nonwoven fabric of the second sheet 16 would face the third sheet 18. The width dimension of the third sheet 18 is substantially the same as the width dimension of the first and second sheets 14, 16, and the overall longitudinal dimension of the third sheet 16 is less than the longitudinal dimension of the rear cover 44. The third panel 18 is welded along three edges thereof to the rear cover 44, along the wallet's left, lower and right edges 26, 24, 28, by means of the welded edge seam 30. A fourth edge 48 of the third sheet 18 remains unsealed, the second and third sheets 16, 18 forming a pocket 50 superposed on the rear cover 44 and having an opening 52 defined by the third sheet's unsealed edge 48 for receiving the compact disc 12.

The third sheet 18 is further welded to the second sheet 16, but not to the first sheet 14, by means of a weld seam 54 defining the longitudinal depth of the pocket 50 to which the CD 12 may be inserted when received by the pocket opening 52. The seam 54 is situated along a circular arc 56 having a radius slightly greater than the radius of the CD 12, and the seam 54 is longitudinally positioned on the second sheet 16 such that the entire CD 12 is contained on the second sheet 16, as well as on the inner surface of the rear cover 44, when the CD 12 is contained in the pocket 50. The seam 54 may take the form of a discrete weld (situated, for example, at the lowermost position along the arc 56), although it is preferred that the seam 54 extend along the circular arc 56 as shown in FIG. 1. The circular arc 56 preferably exceeds 180°, terminating at termini 58 at each end of a horizontal chord 60 (as viewed in the drawing of FIG. 1 and shown in phantom therein). The weld of the arcuate seam 54 may continue along the circular arc 56 until reaching the arc's termini 58 as shown in FIG. 1, or the seam 54 may be discontinuous along the circular arc 56. The welds at the termini 58 of the arc 56 may be spot welds.

The welds at the termini 58 of the circular arc 56 (i.e., in the preferred embodiment of FIG. 1, the termini 58 of the circular arc 56 along which the seam 54 extends) define a second opening 62 of the pocket 50, between the superposed second and third sheets 16, 18, of sufficient width (as represented by the chord 60) for permitting passage through the second opening 62 and into the arc 56 of at least one-half (and preferably more than one-half) of the CD 12 when the CD is received by the first opening 52. When the CD 12 is inserted in the pocket 50, the CD 12 should be oriented such that its optical digitally encoded surface faces the second sheet 16, engaging the exposed surface of the nonwoven fabric of the second sheet 16 (if a composite second sheet is utilized), while the CD's printed surface faces the third sheet 18 which is preferably transparent for viewing the CD's printed surface when the CD wallet 10 is in its open condition. For increased protection of the CD 12, it is preferred that the overall longitudinal dimension of the third sheet 18 is sufficiently great that substantially the entirety of the CD 12 is contained in the pocket 50 when at least one-half of the CD 12 is received by the second opening 62, such as is shown in FIG. 1.

The width of the second opening 62 of the CD pocket 50 and the diameter of the circular arc 56 (i.e., the inside diameter of the arcuate seam 54 of the preferred CD wallet 10 of FIG. 1) are related to the diameter and thickness of the CD 12 such that the CD 12 resists withdrawal from within the seam 54 through the second opening 62 when at least one-half of the CD 12 is received by the second opening 62 for being contained within the arc 56. The width of the second opening 62 is greater than the diameter of the CD 12 by a distance for increasing drag force on the CD 12 when the CD is outwardly urged from the CD pocket 50 (i.e. upwardly urged as viewed in the drawing of FIGS. 1 and 2) while at least one-half of the CD 12 is contained within the arc 56.

The fourth flexible plastic sheet 20 is superposed on the inner surface of the CD wallet's front cover 42, with the second plastic sheet 16 interposed between the first and fourth sheets 14, 20. The fourth sheet 20 has a width dimension substantially the same as the width dimension of the first and second sheets 14, 16, and a longitudinal dimension less than the longitudinal dimension of the front cover 42. The fourth sheet 20 is welded along three of its edges to the front cover 42, along the wallet's left, upper and right edges 26, 22, 28, by means of the welded edge seam 30. The fourth edge 64 of the fourth sheet 20 remains unsealed, resulting in a second pocket 66 between the front cover 42 and the fourth sheet 20 having an opening 68 preferably parallel to or otherwise facing the spine 46. The second pocket 66 may be utilized to contain a document such as a booklet 70 containing notes relating to the information embedded in the CD 12. Such program notes document or booklet 70 typically includes an outer leaf having graphics thereon, and the fourth sheet 20 is preferably transparent so that such program notes document outer graphics may be viewed therethrough when the CD wallet 10 is in its open condition.

The alternative CD wallet embodiment 10' shown in FIGS. 3 and 4 is similar to the preferred CD wallet embodiment 10 of FIGS. 1 and 2, except as noted in this paragraph. The longitudinal dimension of the rectangular second sheet 16' of the alternative CD wallet 10' (FIGS. 3 and 4) is slightly less than the longitudinal dimension of the wallet's rear cover 44 and preferably greater than the overall longitudinal dimension of the third sheet 18. The second sheet 16' is welded along three of its edges to three edges of the rear cover 44, and the second sheet's fourth edge 72 remains unsealed, resulting in a pocket 74 between the rear cover 44 and the second sheet 16' having an opening between the second sheet's unsealed edge 72 and the first sheet 14 preferably adjacent and parallel to or otherwise facing the spine 46. A substantially rectangular fifth flexible plastic sheet 76, having a width dimension substantially the same as that of the front cover 42 and a longitudinal dimension slightly less than that of the front cover 42, is interposed between the first and fourth sheets 14, 20 and is welded along three of its edges to three edges of the front cover 42. The fourth edge 78 of the fifth sheet 76 remains unsealed, resulting in a pocket 80 between the front cover 42 and the fifth sheet 76 having an opening defined by the unsealed edge 78 preferably adjacent and parallel to or otherwise facing the spine 46. The pockets 74, 80 and the positions of their openings on opposite sides of the wallet's spine 46 permit the graphics sheet 32 to be inserted into and removably contained in both pockets 74, 80, rather than being captively contained or entrapped in the CD wallet as shown in FIGS. 1 and 2. It is noted that, except for the configuration of the third sheet 18, the alternative CD wallet embodiment 10' is similar to the CD wallet disclosed in parent applications Ser. Nos. 08/455,015 and 08/326,540, shown and described specifically in FIGS. 4–9 and the corresponding specification text thereof.

The improvement of the present invention is concerned with the configuration of the third sheet 18 forming the CD pocket 50 with the second sheet 16 or 16', as shown in FIGS. 1–4 but as best shown in FIGS. 1 and 2. The unsealed edge 48 of the third sheet 18 extends between opposing welded together edges of the second and third sheets 16, 18, i.e. between the wallet's left and right edges 26, 28. The third sheet 18, or more specifically the unsealed edge 48 of the third sheet 18, is projectively contoured, i.e. the third sheet 18 juts out along the contour of the unsealed edge 48 and forms a projection between the left and right extremities 82, 84 of the unsealed edge 48 at the weld seam 30. In the wallet configurations as shown in FIGS. 1 and 3, the unsealed edge 48 of the third sheet 18 projects toward the wallet's spine 46.

As best shown in FIG. 1, the unsealed edge 48 of the third sheet 18 extends along an arc of radius at least as great as (and preferably slightly greater than) approximately the radius of the CD 12, the arc 86 preferably being a circular arc substantially concentric with the CD 12 when the CD is contained in the pocket 50. The arc 86 along which the unsealed edge 48 extends may be as great as 180°, although it is preferably 160° or less. In one suitable example of a wallet in accordance with the present invention, the arc 86 along which the unsealed edge 48 extended was approximately 135°.

The typical compact disc or CD 12 includes a central aperture 88, and the third sheet 18 of the wallet of the present invention includes an opening or aperture 90 for affording or permitting manual access by a person through the third sheet 18 to the CD 12 at its central aperture 88 when the CD 12 is contained in the CD pocket 50. The aperture 90 may be substantially circular and of a diameter slightly larger than the CD central aperture 86 and concentric therewith, for exposing the annular edge of the CD central aperture 88 when the CD 12 is contained in the pocket 50. The third sheet 18 includes a slit 92, with slit edges 94, communicating with or between the unsealed edge 48 and the aperture 90 of the third sheet 18. As shown in FIG. 1, the slit 92 longitudinally extends from the aperture 90 to a discontinuity or narrow gap 96 (shown in phantom in FIG. 1) in the projectively contoured unsealed edge 48 approximately midway between the unsealed edge's extremities 82, 84 (i.e. mid-width the third sheet 18). The width of the slit 92, (i.e. the distance between the slit edges 94) is preferably less than or narrower than the aperture 88 of the third sheet 18, and preferably narrower than the diameter of the disc aperture 88. The combination of the aperture 90 and the slit 92 permits a person to manually grasp the CD 12 at the annular edge of the CD aperture 88 (with his/her thumb) and at the CD's circumferential or outer edge 98 (with another finger) for removing the CD 12 from the pocket 50 without touching either of the flat surfaces of the CD 12. The combination of the third sheet's aperture 90 and slit 92 produces a thumb notch for facilitating removal of the CD 12 from the pocket 50, but in addition the narrowness of the gap 96 and slit 92 permits the gap and slit to not substantially detract from the functional advantage of the projective contour of the third sheet's unsealed edge 48 in facilitating the CD's entry into the pocket 50, as discussed below.

The projective contour of the unsealed edge 48 of the third sheet 18 facilitates entry of the CD 12 into the pocket 50, as well as facilitating removal of the CD 12 from the pocket 50, as illustrated in FIGS. 5 and 6. The wallet 10, for example, is shown in an open configuration, such as when the wallet's rear cover 44 is held in a person's hand with the front cover 42 backwardly extending from its spine 46. This causes a portion of the rear cover 44, between the spine 46 and the extremities 82, 84 of the third sheet's unsealed edge 48 at the weld seam 30, to flex backwardly (i.e. to the left as shown in the drawing of FIGS. 5 and 6). When the CD is not contained in the wallet, as represented in FIG. 5, the resulting separation between the upper portions of the rear cover 44 and the third sheet 18, and in particular the projectively contoured unsealed edge 48 of the third sheet 18, facilitates insertion of the CD 12 into the first opening 52 of the CD pocket 50. When it is desired to remove the CD 12 from the wallet's CD pocket 50 (see FIG. 6), this separation permits the tip of the person's finger (which grasps the circumferential edge 98 of the CD 12) to be accommodated during the initial stages of CD removal.

It may be appreciated that the ease of CD entry may be maximized if the projectively contoured unsealed edge 48 (i.e. the projective contour of the unsealed edge 48) were continuous between its welded extremities 82, 84. Such continuity would not be consistent with an open thumb notch for facilitating CD removal, although the slot shown in FIGS. 4, 8 and 9 of parent application Ser. No. 08/326,540 may be utilized with such a continuous projectively contoured unsealed edge 48. The discontinuity or gap 96 provided by the slit 92 at the projectively contoured unsealed edge 48 should be narrow, ideally merely a slit without width, for precluding or decreasing the likelihood that the entering CD will inadvertently enter the slit 92 (i.e. be caught between the slit edges 94) for preventing the CD from entering and being contained within the pocket 50. The narrower the gap 96 and slit 92, however, the greater would be the likelihood of annoying interference of the gap 96 and slit edges 94 with a person's thumb when inserting or withdrawing the CD 12 into from the CD pocket 50. In examples of two wallets in which an accommodation of these two effects was provided, the width of the slit 92 was approximately 0.188 inch in one wallet and approximately 0.250 inch in the other wallet. The slit edges 94 preferable intersect the contoured unsealed edge 48 at rounded corners (of, say, 0.375 inch radius), and the slit edges 94 preferable intersect the aperture 90 at rounded corners (of, say, 0.375 inch radius), for further decreasing thumb interference.

It may be observed that the slit 92 and aperture 90 may appear as generally teardrop shaped. The slit 92 may gradually widen as it approaches the aperture 90, with the combination more closely resembling a teardrop shape.

In one suitable example of a CD wallet 10 fabricated of transparent 115 micron polypropylene first and third sheets 14, 18 and a second sheet of one ounce spun or nonwoven polypropylene fabric laminated to a 60 micron polypropylene backing, for containing a CD 12 of nominally 120 millimeter diameter (approximately 4.724 inches) and 0.050 inch thickness, the wallet's front and rear covers 42, 44 were each approximately 5 inches in their width dimension and approximately 5 17/32 inches in their longitudinal dimension with an approximately 3/16 inch spine 46. The overall longitudinal dimension of the third sheet 18 was 5.340 inches with the center of the aperture 90 positioned 2.688 inches from the spine 46, and the unsealed edge's welded extremities 82, 84 were longitudinally situated approximately 1.493 inches from the unsealed edge 48 at its closest point to the spine 46. The radius of the circular arc 86 of the unsealed edge 48 was approximately 2.547 inches and the radius of the aperture 90 was approximately 0.500 inch, and the width of the slit 92 was approximately 0.250 inch. In accordance with these dimensions, the arc 86 along which the unsealed edge 48 extends was approximately 135°.

The width of the welded seam 54 was approximately 3/64 inch, the radius of the circular arc 56 was approximately 2.422 inches, and the welds or termini 58 of the seam 54 were situated approximately 15/32 inch above the horizontal diameter of the arc 56. In accordance with these dimensions, the circular arc 56 was approximately 200°, the width of the second opening 62 of the CD pocket 50 was approximately 4 25/32, and the width of the CD pocket's first opening (i.e. the opening between the welded extremities 82, 84) was approximately 4 27/32 inches.

It is noted that a suitable method for fabricating the preferred embodiment of the CD wallet 10 is taught in parent application Ser. No. 08/455,051, specifically as shown and disclosed in the drawing of FIGS. 16 and 17 thereof and the corresponding specification text thereof, consideration being taken for the differing configurations of the thumb notches and of the unseamed edges of the respective CD pockets.

Thus, there has been described a wallet for protectively storing a compact disc or CD, and in particular an improved CD pocket for facilitating entry and removal of a CD into and from the pocket. Other embodiments of the invention and other configurations of the embodiments presented herein may be developed without parting from the essential characteristics thereof. Accordingly, the invention should be limited only by the scope of the claims listed below.

We claim:

1. A wallet for containing a compact disc, comprising:

a compact disc having a central aperture;

a rectangular first flexible plastic sheet foldable along its width dimension to form a front cover and a rear cover separated by a spine;

a rectangular second flexible plastic sheet in superposed relation with said first sheet and welded to said first sheet along at least three edges thereof including three edges of one of said covers; and a third flexible plastic sheet superposed on said one cover with said second sheet interposed between said first and third sheets, said third sheet welded along three edges thereof to three edges-of said second sheet forming a pocket superposed on said one cover and having an opening between said second sheet and an unsealed edge of said third sheet for receiving said disc, said unsealed edge having a contour projecting toward said spine and extending between opposing welded together edges of said second and third sheets, said third sheet having an aperture for permitting access to said disc at said disc aperture when said disc is contained in said pocket, said third sheet having a narrow gap in said unsealed edge approximately mid-width said third sheet and communicating with said aperture of said third sheet.

2. The wallet according to claim 1, wherein:

said gap in said unsealed edge communicates with said aperture of said third sheet along a slit in said third sheet.

3. The wallet according to claim 1, wherein:

said slit is narrower than said aperture of said third sheet.

4. The wallet according to claim 1, wherein:

said unsealed edge extends along an arc of radius at least as great as approximately the radius of said disc.

5. The wallet according to claim 4, wherein:

said arc along which said unsealed edge extends is approximately 180° or less.

6. The wallet according to claim 4, wherein:

said arc along which said unsealed edge extends is approximately 160° or less.

7. The wallet according to claim 4, wherein:

said arc along which said unsealed edge extends is approximately 135°.

8. The wallet according to claim 4, wherein:

said arc is a circular arc substantially concentric with said disc when said disc is contained in said pocket.

9. The wallet according to claim 1, wherein:

said third sheet is welded to said second sheet by a seam defining the depth in said pocket to which said disc may be inserted when received by said opening.

10. The wallet according to claim 9, further including:

two welds welding together said sheets and defining therebetween a second opening of said pocket for permitting passage through said second opening of at least one-half but not the entirety of said disc when said disc is received by said opening along said unsealed edge, the width of said second opening being related to the diameter and thickness said disc such that said disc resists withdrawal from within said pocket through said second opening when at least one-half of said disc is received by said second opening.

11. The wallet according to claim 9, wherein:

said seam is situated along a circular arc having a radius slightly greater then the radius of said disc and substantially concentric with said disc when said disc is contained in said pocket.

12. The wallet according to claim 11, wherein:

said arc exceeds 180° and said seam includes welds at the termini of said arc defining a second opening of said pocket for permitting passage therethrough of at least one-half but not the entirety of said disc when said disc is received by said opening along said unsealed edge, the width of said second opening being related to the diameter and thickness of said disc such that said disc resists withdrawal from within said pocket through said second opening when at least one-half of said disc is received by said second opening.

13. The wallet according to claim 12, wherein:

substantially the entirety of said disc is contained in said pocket when at least one-half of said disc is received by said second opening.

14. A wallet for containing a compact disc, comprising:

a compact disc having a central aperture;

a rectangular transparent first flexible plastic sheet and a rectangular second flexible plastic sheet of substantially the same dimensions as said first sheet, said first and second sheets welded together along four edges thereof;

a rectangular graphics sheet interposed between said first and second sheets and enclosed within the welded edges of said welded together first and second sheets, said graphics sheet having graphics thereon viewable through said first sheet;

said welded together first and second sheets and said interposed graphics sheet foldable along their width dimension to form a front cover and a rear cover separated by a spine; and a third flexible plastic sheet superposed on one of said covers with said second sheet interposed between said first and third sheets, said third sheet welded along three edges thereof to three edges of said one cover forming a pocket having an opening between said one cover and an unsealed edge of said third sheet for receiving said disc, said unsealed edge extending between opposing welded together edges of said one cover and said third sheet and projectively contoured toward said spine, said third sheet having an aperture for permitting access to said disc at said disc aperture when said disc is contained in said pocket, said third sheet having a narrow gap in said unsealed edge approximately mid-width the third sheet and communicating with said aperture of said third sheet.

15. The wallet according to claim 14, further including:

a fourth flexible plastic sheet superposed on the other of said covers with said second sheet interposed between said first and fourth sheets, said fourth sheet welded along three edges thereof to three edges of said other cover forming a pocket between said other cover and said fourth sheet having an opening along an unsealed edge of said fourth sheet facing said spine.

16. The wallet according to claim 14, wherein:

said gap in said unsealed edge communicates with said aperture of said third sheet along a slit in said third sheet.

17. The wallet according to claim 14, wherein:

said slit is narrower than said aperture to said third sheet.

18. The wallet according to claim 14, wherein:

said unsealed edge extends along an arc of radius at least as great as approximately the radius of said disc.

19. The wallet according to claim 18, wherein:

said arc along which said unsealed edge extends is approximately 180° or less.

20. The wallet according to claim 18, wherein:

said arc along which said unsealed edge extends is approximately 160° or less.

21. The wallet according to claim 18, wherein:

said arc along which said unsealed edge extends is approximately 135°.

22. The wallet according to claim 18, wherein:

said arc is a circular arc substantially concentric with said disc when said disc is contained in said pocket.

23. The wallet according to claim 14, wherein:

said third sheet is welded to said second sheet by a seam defining the depth in said pocket to which said disc my be inserted when received by said opening.

24. The wallet according to claim 23, further including:

two welds welding together said sheets and defining therebetween a second opening of said pocket for permitting passage through said second opening of at least one-half but not the entirety of said disc when said disc is received by said opening along said unsealed edge, the width of said second opening being related to the diameter and thickness of said disc such that said disc resists withdrawal from within said pocket through said second opening when at least one-half of said disc is received by said second opening.

25. The wallet according to claim 23, wherein:

said seam is situated along a circular arc having a radius slightly greater than the radius of said disc and substantially concentric with said disc when said disc is contained in said pocket.

26. The wallet according to claim 25, wherein:

said arc exceeds 180° and said seam includes welds at the termini of said arc defining a second opening of said pocket for permitting passage therethrough of at least one-half but not the entirety of said disc when said disc is received by said opening along said unsealed edge, the width of said second opening being related to the diameter and thickness of said disc such that said disc resists withdrawal from within said pocket through said second opening when at least one-half of said disc is received by said second opening.

27. The wallet according to claim 26, wherein:

substantially the entirety of said disc is contained in said pocket when at least one-half of said disc is received by said second opening.

28. A device for holding a compact disc, comprising:

a compact disc having a central aperture;

a rectangular flexible plastic sheet and another flexible plastic sheet in superposed relation and welded together along three edges thereof forming a pocket having an opening between said rectangular sheet and an unsealed edge of said other sheet for receiving said disc, said unsealed edge extending between opposing welded together edges of said sheets and projectively contoured, said other sheet having an aperture for permitting access to said disc at said disc aperture when said disc is contained in said pocket, said other sheet having a narrow gap in said unsealed edge approximately mid-width thereof and communicating with said aperture of said other sheet.

29. The device according to claim 28, wherein:

said gap in said unsealed edge communicates with said aperture of said other sheet along a slit in said other sheet.

30. The device according to claim 29, wherein:

said slit is narrower than said aperture of said other sheet.

31. The device according to claim 28, wherein:

said unsealed edge extends along an arc of radius at least as great as approximately the radius of said disc.

32. The device according to claim 31, wherein:

said arc along which said unsealed edge extends is approximately 180° or less.

33. The device according to claim 31, wherein:

said arc along which said unsealed edge extends is approximately 160° or less.

34. The device according to claim 31, wherein:

said arc along which said unsealed edge extends is approximately 135°.

35. The device according to claim 31, wherein:

said arc is a circular arc substantially concentric with said disc when said disc is contained in said pocket.

36. The device according to claim 28, wherein:

said other sheet is welded to said rectangular sheet by a seam defining the depth in said pocket to which said disc my be inserted when received by said opening.

37. The device according to claim 36, further including:

two welds welding together said sheets and defining therebetween a second opening of said pocket for permitting passage through said second opening of at least one-half but not the entirety of said disc when said disc is received by said opening along said unsealed edge, the width of said second opening being related to the diameter and thickness of said disc such that said disc resists withdrawal from within said pocket through said second opening when at least one-half of said disc is received by said second opening.

38. The device according to claim 36, wherein:

said seam is situated along a circular arc having a radius slightly greater then the radius of said disc and substantially concentric with said disc when said disc is contained in said pocket.

39. The device according to claim 38, wherein:

said arc exceeds 180° and said seam includes welds at the termini of said arc defining a second opening of said pocket for permitting passage therethrough of at least one-half but not the entirety of said disc when said disc is received by said opening along said unsealed edge, the width of said second opening being related to the diameter and thickness of said disc such that said disc resists withdrawal from within said pocket through said second opening when at least one-half of said disc is received by said second opening.

40. The device according to claim 39, wherein:

substantially the entirety of said disc is contained in said pocket when at least one-half of said disc is received by said second opening.

* * * * *